(12) United States Patent
Raichlen et al.

(10) Patent No.: US 7,938,285 B2
(45) Date of Patent: May 10, 2011

(54) WOOD CHIP SOAKER

(75) Inventors: Steven Raichlen, Miami, FL (US);
Charles Adams, Berkeley, CA (US)

(73) Assignee: Charcoal Companion Incorporated, Emeryville, CA (US)

( * ) Notice: Subject to any disclaimer, the term of this patent is extended or adjusted under 35 U.S.C. 154(b) by 382 days.

(21) Appl. No.: 11/986,670

(22) Filed: Nov. 21, 2007

(65) Prior Publication Data

US 2008/0164258 A1    Jul. 10, 2008

Related U.S. Application Data

(60) Provisional application No. 60/860,968, filed on Nov. 22, 2006.

(51) Int. Cl.
*B65D 1/34* (2006.01)
*A23B 4/03* (2006.01)
*A23B 4/044* (2006.01)

(52) U.S. Cl. ............... 220/23.88; 220/23.83; 220/23.87; 220/572; 220/573.1; 220/573.5; 220/752; 220/756; 220/912; 99/403; 99/410; 99/413; 99/482

(58) Field of Classification Search ............... 220/23.83, 220/23.87, 23.88, 485, 494, 495, 572, 573.1, 220/573.5, 752, 756, 912; 99/403, 410, 413, 482

See application file for complete search history.

(56) References Cited

U.S. PATENT DOCUMENTS

| | | | | | |
|---|---|---|---|---|---|
| 3,242,849 | A | * | 3/1966 | Wells | 99/411 |
| 3,326,117 | A | * | 6/1967 | Wells | 99/411 |
| 4,919,267 | A | * | 4/1990 | Stoll | 206/507 |
| 6,314,869 | B1 | * | 11/2001 | Bourgeois, Jr. | 99/340 |
| 6,640,695 | B2 | | 11/2003 | Stark | |
| 2004/0216622 | A1 | * | 11/2004 | Martin | 99/482 |

* cited by examiner

*Primary Examiner* — Anthony Stashick
*Assistant Examiner* — Madison L Wright
(74) *Attorney, Agent, or Firm* — Beeson Skinner Beverly, LLP

(57) ABSTRACT

A wood chip soaking apparatus has a fluid holding base container having end walls suited for supporting at least one, and suitably two, or even more, wood chip baskets in the container for pre-soaking the wood chips to be added to a barbeque heat source. Wood chips are preferably supported in the base container on handles projecting from the wood chip baskets. The base container preferably is provided with elevated side walls for supporting the wood chip baskets in an elevated position after soaking for draining the fluid from the baskets.

14 Claims, 3 Drawing Sheets

WOOD CHIP SOAKER

CROSS-REFERENCE TO RELATED APPLICATION

Applicants of this non-provisional application claim the benefit of U.S. Provisional Patent Application Ser. No. 60/860,968, filed on Nov. 22, 2006.

BACKGROUND

The present invention generally relates to the art of barbecuing, and, more particularly, to the use of wood chips in a barbecue to enhance flavor of barbecued foods.

It has been long known that the taste of barbecued food can be enhanced by adding wood chips to the barbecue coals. It is also known that more pronounced flavors can be obtained by first soaking the wood chips in water, or other mixtures, such as water and beer, before adding them to the fire. The soaking causes the wood chips to smolder rather than burst into flames, thereby generating more smoke for flavoring the food. The food flavoring effects of smoking can be altered by changing the wood of the wood chips. For example, heavy woods, like mesquite and pecan wood, have a stronger smoke flavor than fruit woods.

Heretofore, wood chips have conventionally been soaked in fluid-filled containers, and then removed by hand to the barbecue coals, or poured onto the barbecue coals after the fluids have been poured out of the containers. A need exists for an improved way of soaking wood chips, and placing them on barbecue coals.

SUMMARY OF THE INVENTION

Briefly, the invention is directed to a wood chip soaking apparatus for use with a barbeque. The wood chip soaking apparatus allows for a predetermined amount of wood chips to be soaked in a fluid, typically water or water with some flavoring component, and then removed from the soaking fluid, drained, and placed onto the barbecue's heat source without direct handling of the wood chips. The wood chip soaking apparatus is comprised of a base container having side walls and a bottom wall forming a fluid holding chamber, and at least one, and suitably two or more perforated wood chip baskets. The wood chip baskets are fabricated of a heat tolerant material that allows them to be set directly on the barbecue coals. The perforations in the basket provide fluid openings which allow fluid to drain from the baskets when the baskets are removed from the container. In one alternative aspect of the invention, the baskets are provided with side handles for easily handling of the baskets, including ease of lifting them from the base container and onto the barbecue coals. In another alternative aspect of the invention, the side handles of the chip baskets are used to suspend the baskets on one or more top support edges of the base container's side walls. In yet a further alternative aspect of the invention, the base container has a first set of opposed side walls with top support edges at a low elevation relative to the bottom of the container, and a second set of opposed side walls having top edges at a higher elevation in relation to the bottom of the container. The different elevations of the side walls allow the wood chip baskets to be suspended at different heights, first at a lower height for soaking the wood chips, and then at a higher position for allowing fluid to drain from the wood chip baskets.

DETAILED DESCRIPTION OF THE ILLUSTRATED EMBODIMENT

Figure 1:
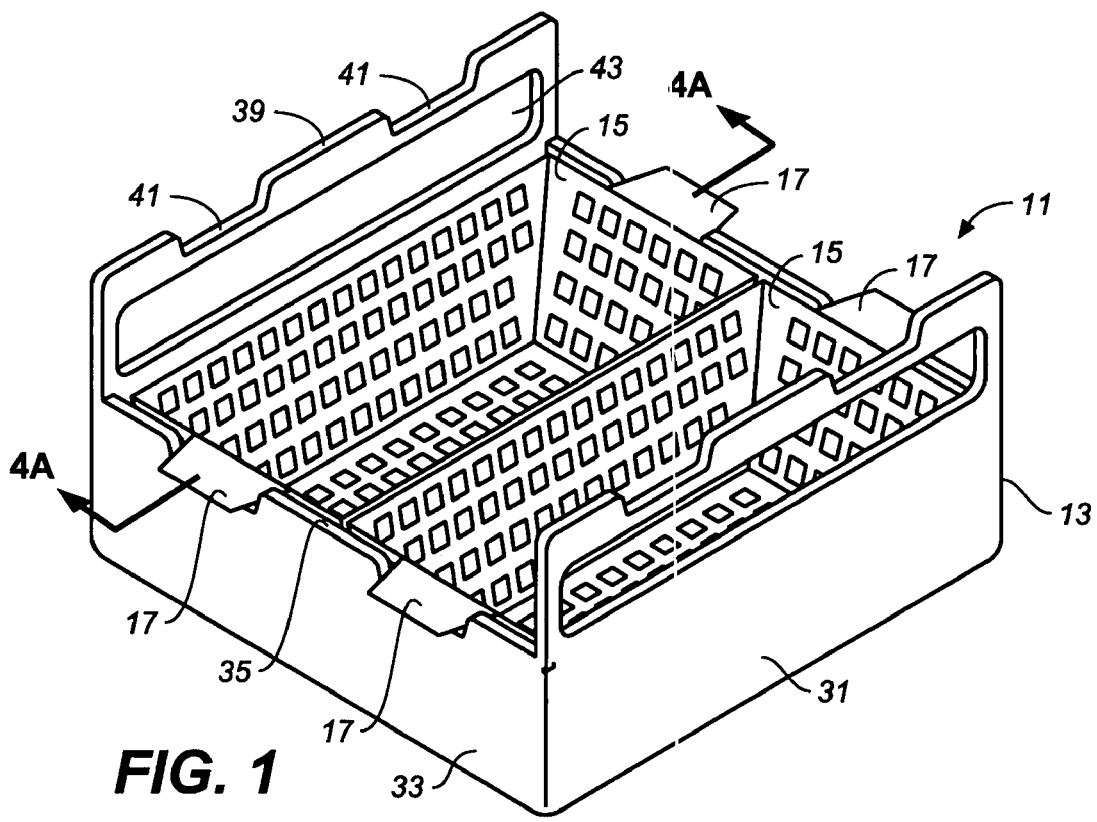
FIG. 1 is a top perspective view of a wood chip soaking apparatus in accordance with the invention, with the wood chip baskets supported in the base container of the apparatus at the lower height for soaking the wood chips in the basket.

Referring now to the drawings, the illustrated wood chip soaking apparatus, denoted by the numeral 11, is comprised of a fluid holding base container 13 and two wood chip baskets 15 sized to fit within the base container. Each of the wood chip baskets includes outwardly projecting side handles 17, which facilitate the handling of the baskets, including lifting them into and out of the base container. As hereinafter described, the basket handles also permit the baskets to be supported on the base container.

The illustrated wood chip baskets have a generally rectangular shape and include a bottom wall 21, side walls 23, and end walls 25. A plurality of fluid openings or perforations 19 are provided in baskets to allow fluid 14 contained in the base container to flood the baskets, and to allow the baskets to drain when the wood chip baskets are lifted out of the base container. Preferably, the perforations are distributed over the side, end and bottom walls of the baskets as shown to maximize fluid in-flow and outflow through the basket walls, however, fewer perforations, and perforations on some walls but not others, are possible and considered within the scope of the invention. The handles 17 extend outwardly from the top edge 27 of each of the basket's end walls 25, such that the baskets hang down below the handles. The baskets are suitably fabricated of a metal material, such as stainless steel, and can be suitably fabricated from a punching and bending process.

While the wood chip baskets are shown in pairs in the illustrated embodiment, it is understood that a single wood chip basket of a larger size could be provided that fits within the base container. Alternatively, each of the wood chip containers could be made of a smaller size such that more than two wood chip containers fit within the base container. Furthermore, the baskets could be made in other shapes than as shown, as could the base container. However many wood chip containers are used and whatever their shape, they should be sized such that they can be readily lifted out of the base container for draining the baskets, and for subsequent placement on the barbecue coals.

Figure 2:
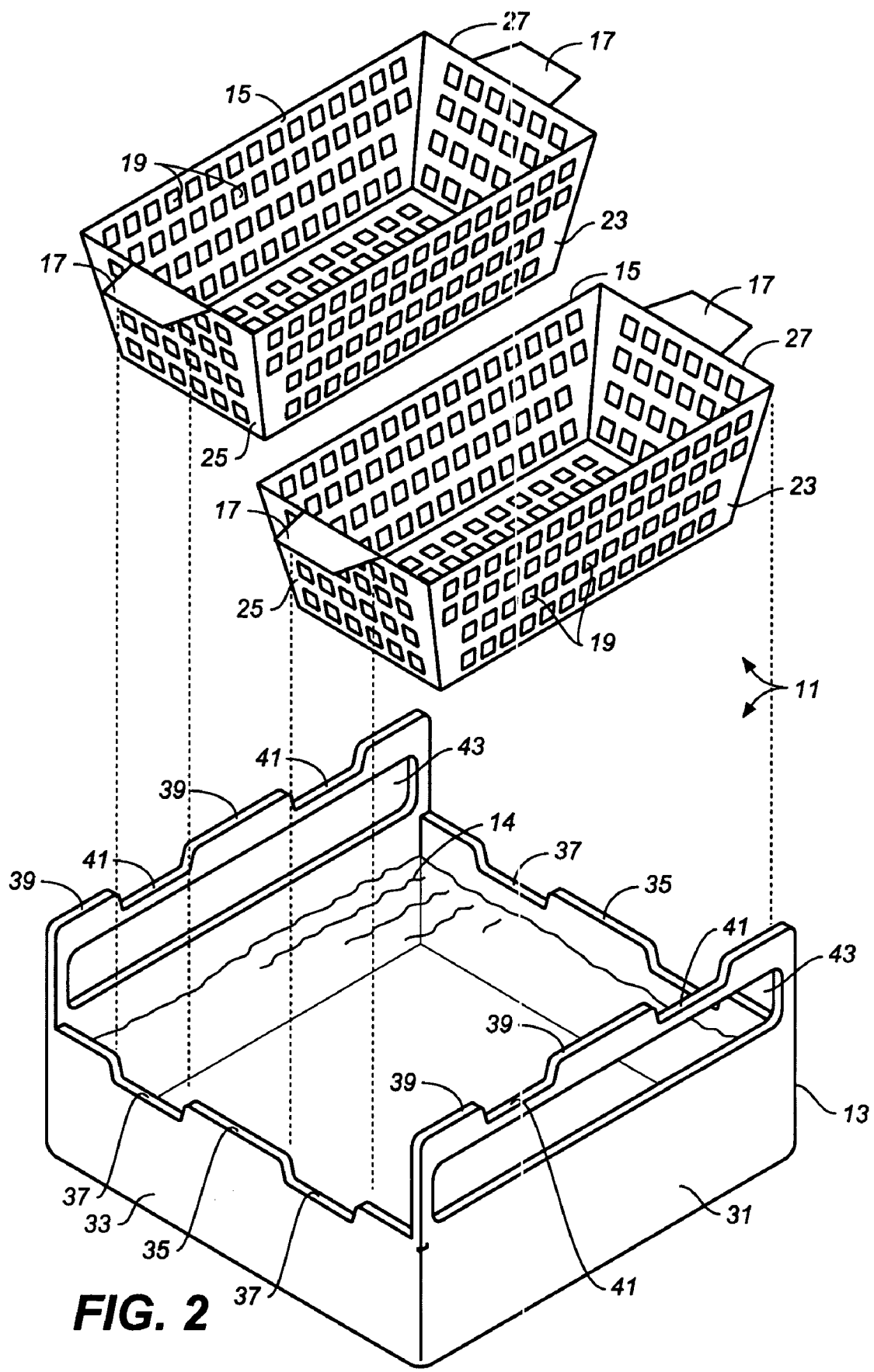
FIG. 2 is an exploded top perspective view thereof, showing the wood chip baskets lifted from the base container.

The fluid holding base container 13 can be fabricate of any suitable material, including plastic. The base container includes a bottom wall 29, high side walls 31, and low side walls 33, all of which form a fluid holding chamber 14. As best illustrated in FIGS. 1 and 2, the wood chip basket 15 and outwardly projecting basket handles 17 are designed such that the basket handles extend over and are supported by the top edges 35 of each of the base container's low side walls 33 when the baskets are set into the base container in the illustrated orientation. Top edges 35 are preferably provided with notched out portions 37, into which the chip basket handles will fit when the chip baskets are placed in the container. These notched out portions will facilitate the placement and retention of the chip baskets on the container side walls in their proper side-by-side position.

Figure 3:
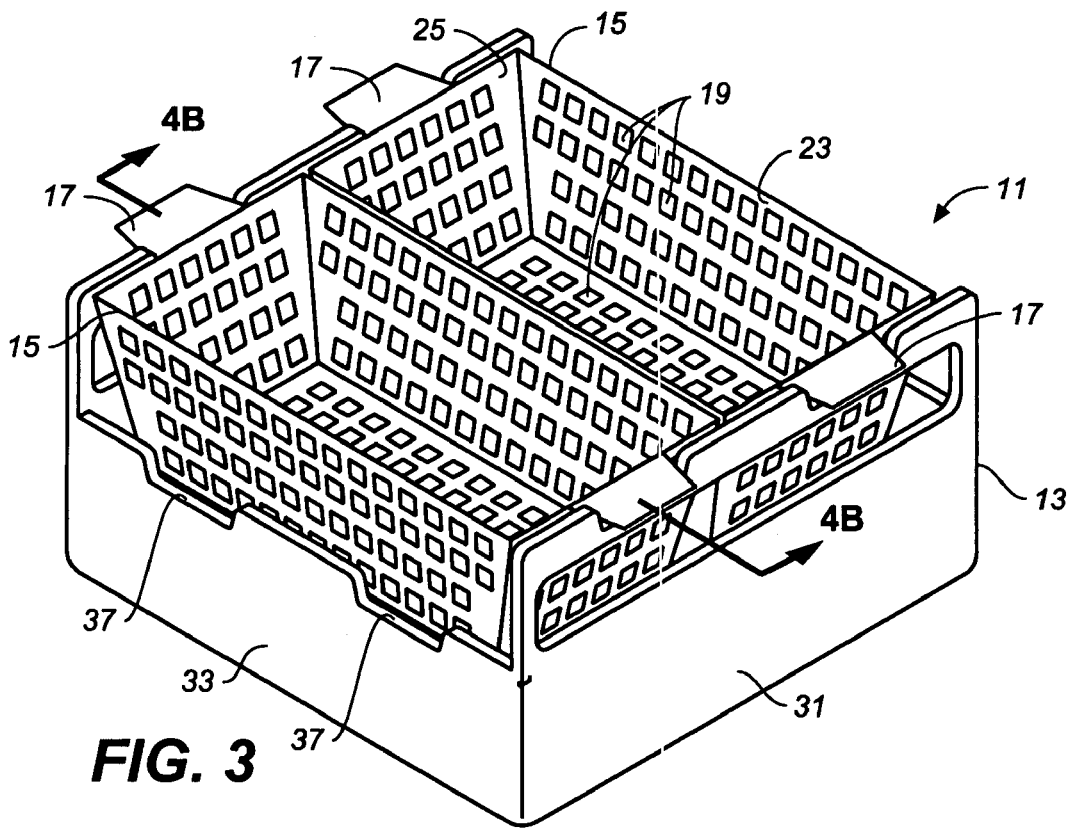
FIG. 3 is a top perspective view thereof, showing the wood chip baskets supported at an elevated position on the base container for draining the wood chip baskets.
Figure 4A:
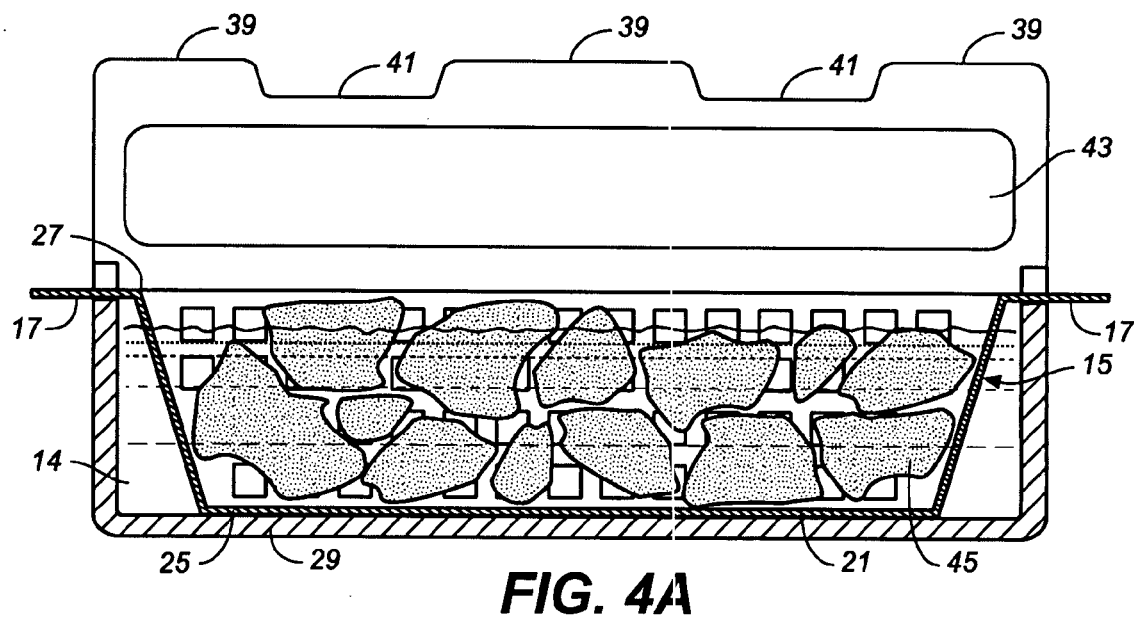
FIG. 4A is a cross-sectional view of the wood chip apparatus shown in FIG. 1 taken along lines 4A-4A.
Figure 4B:
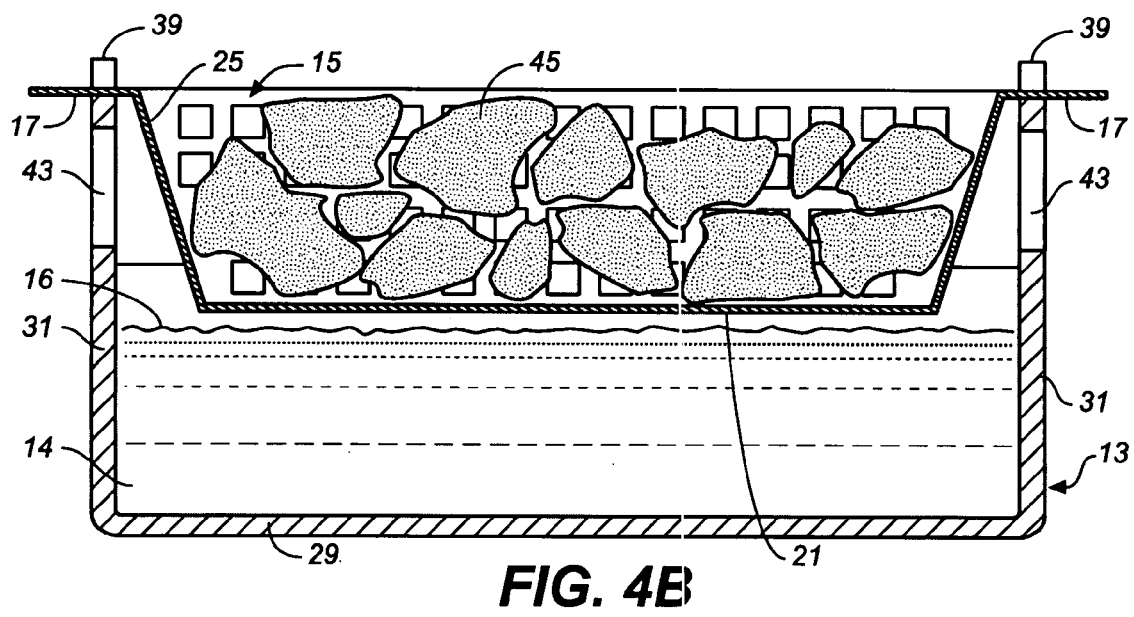
FIG. 4B is a cross-sectional view of the wood chip apparatus shown in FIG. 3 taken along lines 4B-4B.

The high side walls 31 of base container 13 provide a means for temporarily suspending the wood chip baskets above the fluid level (denoted by the numeral 16 in FIG. 4B) in the container so that the baskets and their load of chips can drain before placing them on the barbecue coals. The height of these walls is preferably chosen such that, when the baskets are placed on the walls as shown in FIGS. 3 and 4B, the bottom wall of each basket will be raised somewhat above the level of the fluid in the container. It is contemplated that the base container will preferably have a substantially square shape such that, when the baskets are rotated by 90 degrees, the basket handles 17 will hang over the elevated top edges 39 of the high side walls 31, as they do with the low side walls. But other configurations that would allow the baskets to be supported by the high and low sidewalls of the container are possible, for example, by providing a rectangular container with inwardly projecting handle engaging structures on which the basket handles can rest.

As with the low side walls 33, the elevated top edges 39 of side walls 31 can be provided with notches 41 for receiving the extended handles of the wood chip baskets. And as with notches 37 in top edges 35 of the lower side walls, notches 41 in the high side walls will facilitate the location and retention of the chip baskets in their shown elevated position. It is further noted that the high side walls 31 are shown with handle cutouts 43 to form handles on the high walls for ease of gripping and lighting the base container.

To use the illustrated wood chip soaker apparatus, the wood chip baskets are first filled with a measured quantity of wood chips 45, and the wood chip baskets placed in the base container with the basket handles 17 oriented toward the low side walls 33 of base container 13. Each basket is settled into the base container by moving the handles into the handle notches 37. The base container is then filled with the desired fluid, such as water or water with a flavoring ingredient, so as to submerge the wood chips contained in the baskets. After the chips are allowed to soak for a suitable period of time, the baskets are lifted off of the lower end walls, rotated 90°, and then set back down onto the high side walls, such that the basket handles slide into notches 41 on the top edges of the high side walls. In this position, the wood chips and wood chip baskets will be elevated above the soaking fluid 16, as illustrated in FIG. 4B. Here, the wood chip baskets and wood chips can be allowed to completely drain before they are lifted off base container for placement onto the coals of a barbeque. (It is noted that the wood chip filled baskets can be placed in the coals without emptying the wood chips into the coals.) After barbecuing, the baskets can easily be lifted out of the coals, emptied and cleaned, and then reused.

It is noted that the base container is preferably substantially square, to accommodate the dual orientation of the wood chip containers as above described, however, it is not intended that the invention be limited to the geometries shown. It would be possible, for example, for the base container to have other geometries which accommodate one or more wood chip baskets that could be lifted out of the base container. Also, the invention contemplates the possibility of base containers having side and end walls of the same elevation, wherein the wood chip baskets would be removed entirely from the baskets for draining.

While the present invention has been described in considerable detail in the foregoing specification and accompanying drawings, it is not intended that the invention be limited to such detail, except as necessitated by the following claims.

We claim:

1. A wood chip soaking apparatus for a barbecue comprising a base container having a bottom wall, a first set of opposed side walls with top support edges at a low elevation relative to said bottom wall, and a second set of opposed side walls having top support edges at a higher elevation relative to said bottom wall, the bottom wall, first set of opposed side walls and second set of opposed side walls forming a fluid holding chamber;

at least one wood chip basket sized to be removably lowered into the fluid holding chamber of said base container, said wood chip basket having a plurality of fluid openings to allow fluid to drain therefrom, and at least one lift handle for lifting said basket from said base container, said lift handle being adapted to engage at least one of the top support edges of the first set of opposing side walls of said base container for suspending said basket in the fluid holding chamber thereof for soaking wood chips contained in said basket, and further being adapted to engage at least one of the top support edges of the second set of opposing side walls of said base container for suspending said basket above the fluid holding chamber thereof to allow fluid to drain from said baskets, said wood chip basket being fabricated of a heat tolerant material to allow the basket, with soaked wood chip contained therein, to be set over a barbecue heat source.

2. The wood chip soaking apparatus of claim 1 wherein at least two wood chip baskets, each having at least one lift handle, are provided, said wood chip baskets being sized such that they can be removably lowered into the fluid holding chamber of said base container in side-by-side relation and suspended in the fluid holding chamber of said base container for soaking wood chips contained in said baskets, or when turned together their at least one lift handle can engage at least one of the top support edges of said second set of opposing side walls for suspending said baskets above the fluid holding chamber of said base container to allow fluid to drain from said baskets.

3. The wood chip soaking apparatus of claim 2 wherein said base container has a substantially shape.

4. The wood chip soaking apparatus of claim 1 wherein said at least one wood chip basket is rectangular in shape and has two side walls, two end walls and a bottom wall, and at least one lift handle on an end wall thereof.

5. The wood chip soaking apparatus of claim 1 wherein said at least one wood chip basket has two lift handles for engaging the top support edges of both of said first set of opposing side walls, or, when turned, both of said second set of opposing side walls.

6. The wood chip soaking apparatus of claim 1 wherein at least one of said top support edges of said first and second set of opposed side walls has a notched out portion configured to receive said lift handle such that said wood chip basket can be suspended from at least one of either of said first and second set of opposed side walls by engaging the at least one lift handle of said basket in said notched out portion.

7. The wood chip soaking apparatus of claim 1 wherein the second set of opposed side walls of said base container each have a handle cutout forming gripping handles for lifting the base container.

8. A wood chip soaking apparatus for a barbecue comprising a base container having a bottom wall, first set of opposed side walls, and second set of opposed side walls forming a fluid holding chamber, said first set of opposed side walls having top support edges at a low elevation relative to said bottom wall, said second set of opposed side walls having top support edges at a higher elevation relative to said bottom wall; and at least two wood chip baskets fabricated of a heat tolerant material, each being sized to be removably lowered into the fluid holding chamber of said base container, said baskets having a plurality of fluid openings to allow fluid to drain therefrom and lift handles extending outwardly from opposite sidewalls thereof for lifting and lowering said baskets into and out of said base container, the lift handles of said basket being adapted to engage the top support edges of the first set of opposing side walls of said base container for suspending said basket in the fluid holding chamber thereof for soaking wood chips contained in said basket, and further being adapted to engage the top support edges of the second set of opposing side walls of said base container for suspending said basket above the fluid holding chamber thereof to allow fluid to drain from said basket, each of the top support edges of said first and second set of opposed side walls having at least one notched out portion configured to receive said lift handles of said wood chip basket such that said wood chip basket can be suspended from either said first set of opposed side walls or said second set of opposed sidewalls by engaging the lift handles of said basket in the notched out portion on the top edges of said side walls.

9. The wood chip soaking apparatus of claim 8 wherein said at least one wood chip basket has a bottom wall, side walls and end walls, and wherein said plurality of fluid openings are distributed about the side walls, end walls and bottom wall of said wood chip basket.

10. The wood chip soaking apparatus of claim 8 wherein the second set of opposed side walls of said base container each have a handle cutout forming gripping handles for lifting the base container.

11. A wood chip soaking apparatus for a barbecue comprising a base container having a bottom wall, first set of opposed side walls, and second set of opposed side walls, forming a fluid holding chamber, said first set of opposed side walls having top support edges at a low elevation relative to said bottom wall, said second set of opposed side walls having top support edges at a higher elevation relative to said bottom wall; and at least two wood chip baskets fabricated of a heat tolerant material, each being sized to be removably lowered into the fluid holding chamber of said base container, each of said baskets having a plurality of fluid openings to allow fluid to drain therefrom and lift handles extending outwardly from opposite sidewalls thereof for lifting and lowering said baskets into and out of said base container, the lift handles of each of said baskets being adapted to engage the top support edges of the first set of opposing side walls of said base container for suspending said baskets in the fluid holding chamber thereof for soaking wood chips contained in said baskets, and further being adapted to engage the top support edges of the second set of opposing side walls of said base container for suspending said baskets above the fluid holding chamber thereof to allow fluid to drain from said baskets.

12. The wood chip soaking apparatus of claim 11 wherein the top support edges of the first and second set of opposed side walls of said base container have notched out portions configured to receive the lift handles of each of said wood chip baskets such that both of said wood chip baskets can be suspended from said first and second set of opposed side walls of said base container by engaging the lift handles of said baskets in the notched out portions at the top support edges of said opposed side walls.

13. The wood chip soaking apparatus of claim 12 wherein each of said at least two wood chip baskets has a bottom wall, side walls, and end walls, and wherein said plurality of fluid openings are distributed about the side walls, end walls and bottom wall of each of said wood chip baskets.

14. The wood chip soaking apparatus of claim 13 wherein the second set of opposed side walls of said base container each have a handle cutout forming gripping handles for lifting the base container.

* * * * *

UNITED STATES PATENT AND TRADEMARK OFFICE
CERTIFICATE OF CORRECTION

| | | |
|---|---|---|
| PATENT NO. | : 7,938,285 B2 | Page 1 of 1 |
| APPLICATION NO. | : 11/986670 | |
| DATED | : May 10, 2011 | |
| INVENTOR(S) | : Steven Raichlen and Charles Adams | |

It is certified that error appears in the above-identified patent and that said Letters Patent is hereby corrected as shown below:

In column 1, line 49, "easily" should read --easy--.
In column 2, line 53, "fabricate" should read --fabricated--.
In column 4, line 25, "chip" should read --chips--.
In column 4, line 40, --square-- should be inserted between "substantially" and "shape.".

Signed and Sealed this
Twenty-eighth Day of June, 2011

David J. Kappos
*Director of the United States Patent and Trademark Office*